United States Patent [19]

Nuila

[11] Patent Number: 5,339,994
[45] Date of Patent: Aug. 23, 1994

[54] FERTILIZER OR LIKE DRY MATERIAL DISPENSING ASSEMBLY

[76] Inventor: Jorge A. Nuila, 444 Brickell Ave., Suite 51-373, Miami, Fla. 33131

[21] Appl. No.: 966,687

[22] Filed: Oct. 26, 1992

Related U.S. Application Data

[63] Continuation-in-part of Ser. No. 659,615, Feb. 25, 1991, abandoned.

[51] Int. Cl.⁵ ............................................. B67D 5/64
[52] U.S. Cl. .................... 222/175; 222/449; 222/451; 111/95
[58] Field of Search ............... 222/175, 444, 449, 451, 222/441, 529, 527–528; 111/7.2, 95, 170

[56] References Cited

U.S. PATENT DOCUMENTS

| | | | |
|---|---|---|---|
| 249,464 | 11/1881 | Farnham | 222/447 |
| 260,373 | 7/1882 | Erwin . | |
| 346,718 | 8/1886 | Capewell | 222/451 |
| 448,275 | 3/1891 | Stowell . | |
| 454,117 | 6/1891 | Myers | 239/154 |
| 541,417 | 6/1895 | Barnhill . | |
| 714,051 | 11/1902 | Spitzenberg | 239/652 |
| 784,682 | 3/1905 | Jones | 222/175 |
| 967,096 | 8/1910 | Wood | 239/652 |
| 1,061,057 | 6/1913 | Etheridge . | |
| 1,282,194 | 10/1918 | Combs . | |
| 1,361,146 | 12/1920 | Egnatoff . | |
| 1,633,393 | 6/1927 | Miller | 222/447 |
| 1,648,481 | 11/1927 | Hollenback . | |
| 1,768,091 | 6/1930 | Adair . | |
| 1,793,197 | 2/1931 | Speicher . | |
| 1,844,260 | 2/1932 | Nicolino . | |
| 1,857,734 | 5/1932 | Moldovan et al. . | |
| 1,891,038 | 12/1932 | Barros . | |
| 1,894,157 | 1/1933 | Campbell . | |
| 1,931,385 | 10/1933 | Hawes . | |
| 1,976,340 | 10/1934 | Gretschel | 239/154 |
| 2,041,887 | 5/1936 | Ward . | |
| 2,187,868 | 1/1940 | Sweitzer . | |
| 2,221,113 | 11/1940 | Schmitt . | |
| 2,224,540 | 12/1940 | Fraser . | |
| 2,232,571 | 2/1941 | Stark | 222/529 |
| 2,239,464 | 4/1941 | Moger | 222/175 |
| 2,561,578 | 4/1951 | Koester | 222/527 |
| 2,599,118 | 6/1952 | McMillan | 222/175 |
| 2,630,247 | 3/1953 | Rafferty | 222/159 |
| 2,707,068 | 4/1955 | Williamson | 222/175 |
| 2,837,250 | 6/1958 | Hagman | 222/449 |
| 3,945,571 | 3/1976 | Rash | 239/152 |
| 4,081,088 | 1/1989 | Baker | 222/175 |
| 4,109,835 | 8/1978 | Castro | 222/449 |
| 4,407,434 | 10/1983 | Kempf | 222/452 |
| 5,020,725 | 6/1991 | Waldrum | 222/175 |

FOREIGN PATENT DOCUMENTS

| | | | |
|---|---|---|---|
| 1153083 | 7/1959 | France | 222/529 |
| 602324 | 2/1960 | Italy . | |
| 883371 | 8/1960 | United Kingdom . | |

*Primary Examiner*—Andres Kashnikow
*Assistant Examiner*—Philippe Derakshani
*Attorney, Agent, or Firm*—Hill, Steadman & Simpson

[57] ABSTRACT

A dispenser assembly particularly adapted to selectively dispense predetermined amounts of dry fertilizer or other dry material onto an area of disbursement, such as a plant, and including an elongated dispensing conduit having a holding chamber of predetermined dimension connected thereto along with a control mechanism such that selective operation of the control mechanism will automatically dispense, by gravity, a premeasured amount of dry material onto the disbursement area. A double disk valve means is provided having an inlet valve and an outlet valve simultaneously translatable to open one end of the holding chamber and close the respective other end. A gun-shaped valve means is provided as the control mechanism in a preferred embodiment.

12 Claims, 5 Drawing Sheets

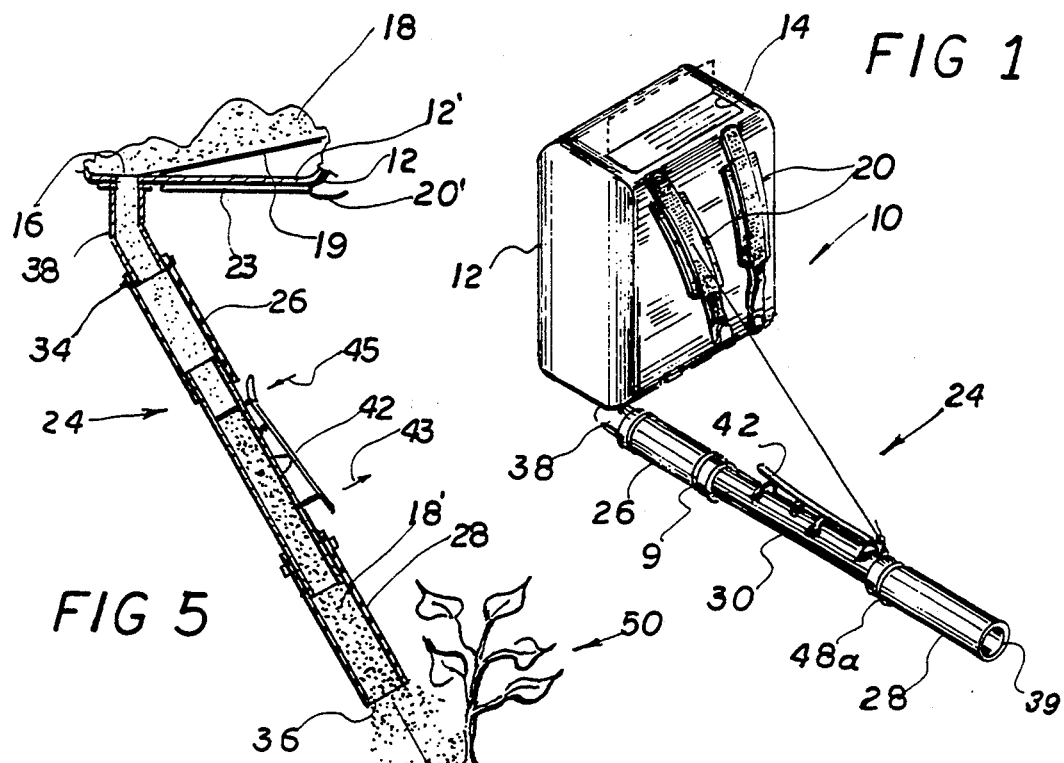
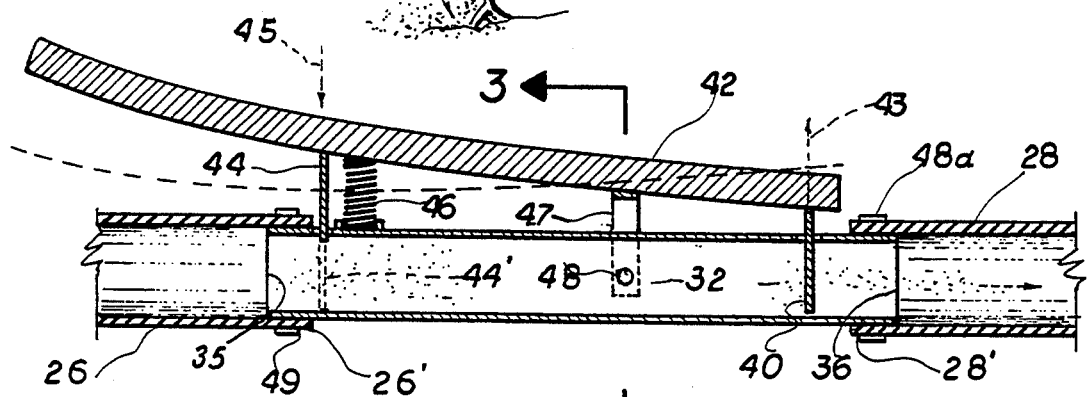
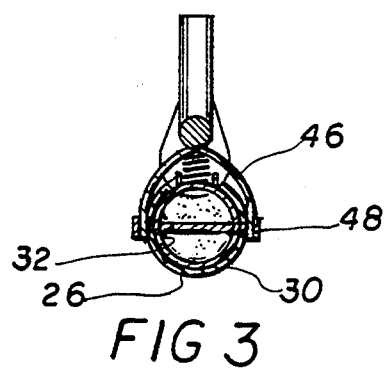
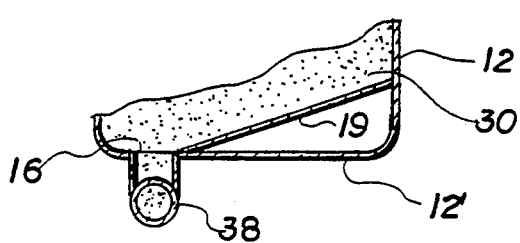

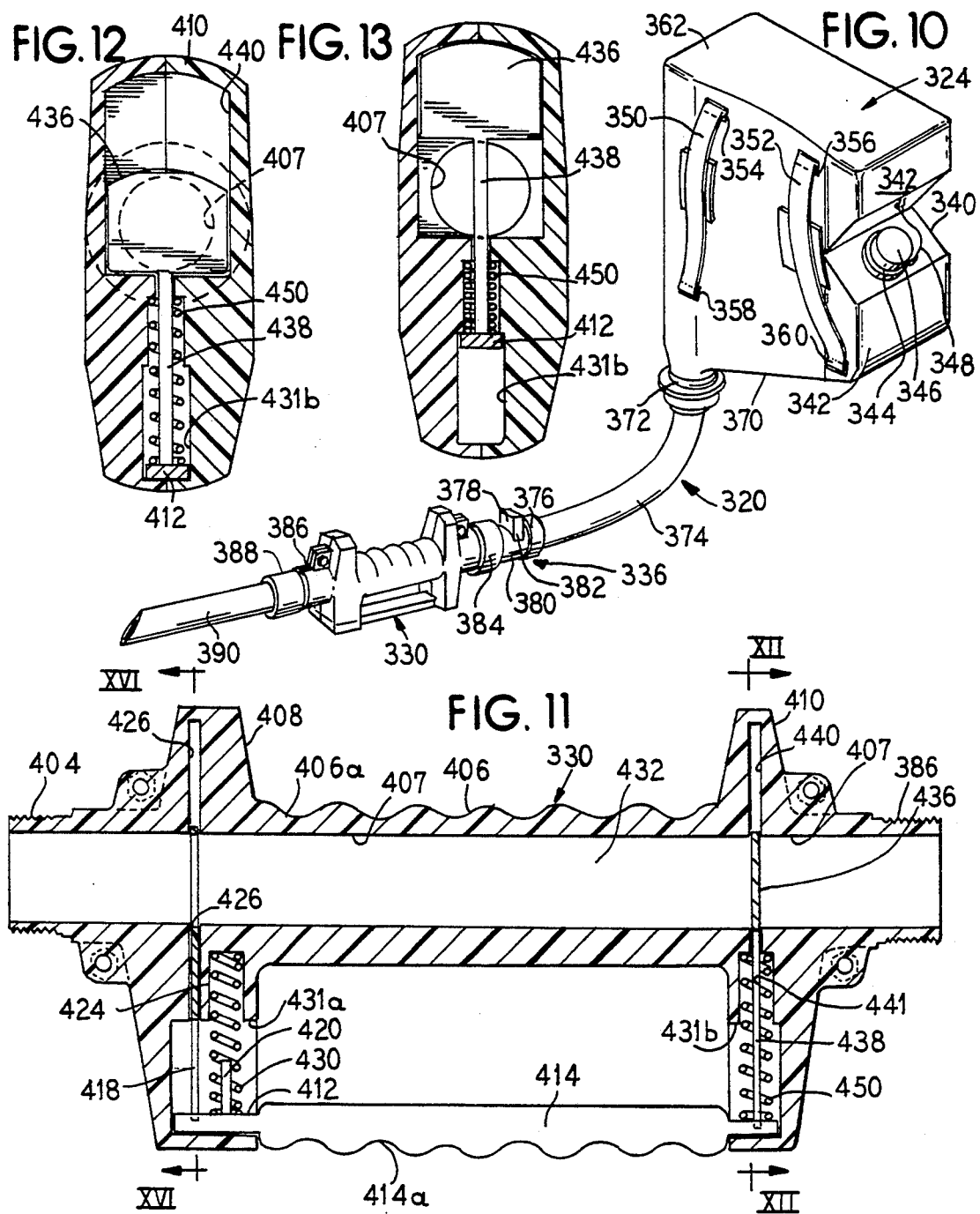

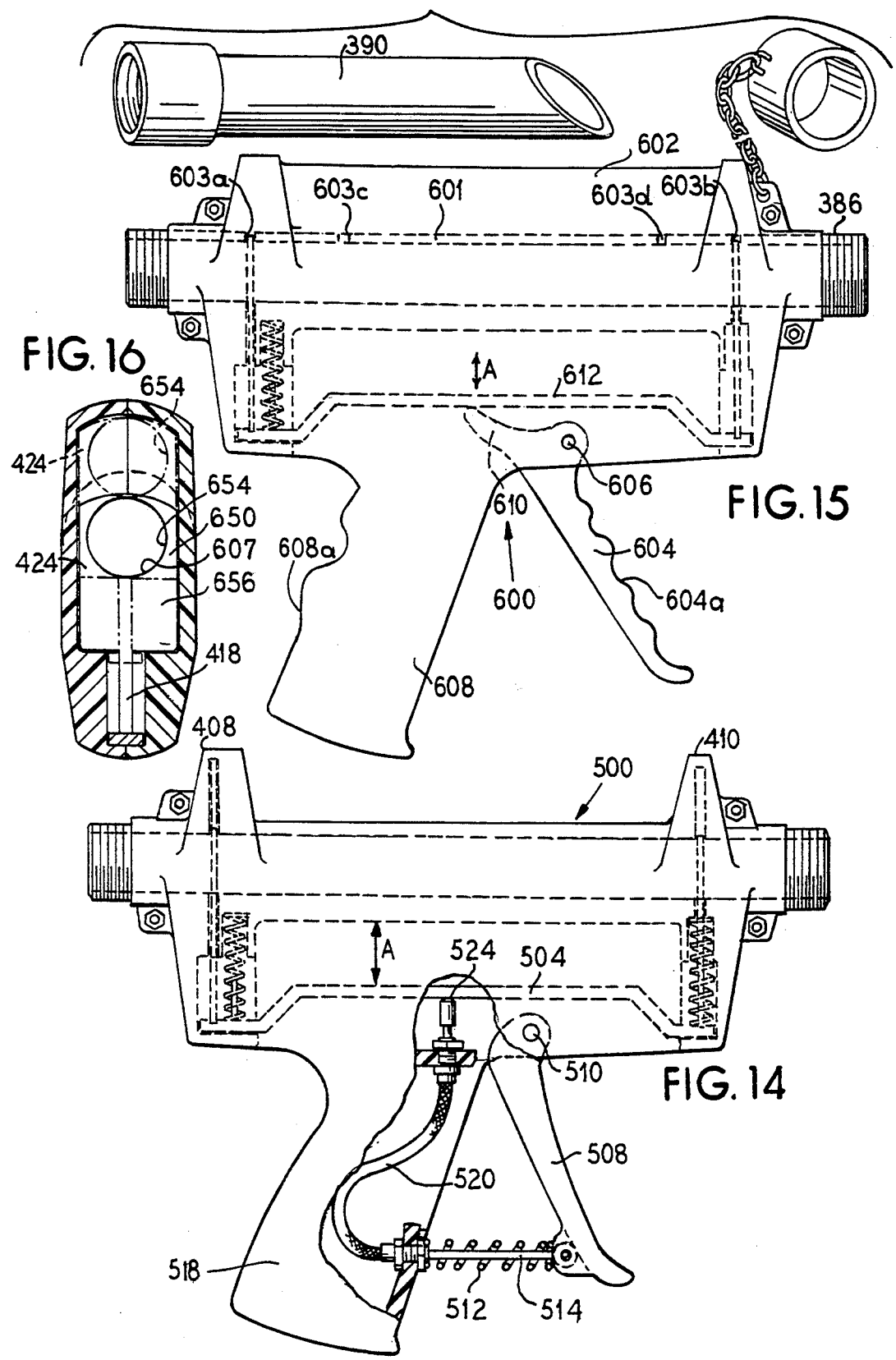

FERTILIZER OR LIKE DRY MATERIAL DISPENSING ASSEMBLY

BACKGROUND OF THE INVENTION

This application is a continuation-in-part of PCT/US92/01465 filed Feb. 25, 1992 which is a continuation-in-part of U.S. Ser. No. 07/659,615, filed Feb. 25, 1991 now abandoned.

FIELD OF THE INVENTION

A dispenser assembly designed to dispense fertilizer or like dry material, by gravity flow, through selective manipulation of a control mechanism by the operator of the assembly.

DESCRIPTION OF THE PRIOR ART

In the agricultural industry, it is, of course, well recognized that proper fertilization must occur in order to render the commercial growing of a given crop feasible. It is also well accepted that the dispensing of the fertilizer properly onto the given crop must be done accurately and in an effective manner to guarantee that the entire crop is properly fertilized.

In the growing of certain crops, particularly in the South American and Latin American countries, it is the practice to utilize a large labor force and through such use fertilize successively each of an extremely large number of plants individually. In accomplishing such fertilizer distribution, it has been found in the past that the fertilizer was normally sprayed onto the plant area after the fertilizer was mixed or blended with a predetermined amount of water. Problems in both time and expense were encountered due to the fact that large amounts of water, as well as the fertilizer itself, had to be transported to what may be considered generally remote areas where the crops were growing. In the aforementioned geographic locations, numerous agricultural areas involved transporting such supplies over mountainous areas. Individual members of the labor force, therefore, had to carry not only the fertilizer but were burdened with the weight of the water mixed with the fertilizer. Based on the above prior art and generally well-known techniques, an extremely large labor force was required and a relatively great amount of time was consumed in accomplishing fertilization. An additional problem associated with such prior art techniques was that the individual crops had to be fertilized more than one time during a growing season.

Based on the above, there is a recognized need in the agricultural industry for the fertilization of individual plants on an independent basis utilizing an assembly which will effectively eliminate the need for mixing the dry and normally particulate fertilizer material with water in order to accomplish an even dispersal of the fertilizer mixture onto the plant. Preferably, such a preferred dispenser assembly would automatically "measure" predetermined amounts of fertilizer in dry, particulate form and through operation of a relatively simple control mechanism dispense the predetermined amounts of premeasured fertilizer directly onto the plant area or other desired area of disbursement.

SUMMARY OF THE INVENTION

The present invention relates to a dispenser assembly primarily designed for use in dispensing fertilizer onto individual plants or other disbursement areas. It should be emphasized, however, the subject dispenser assembly can be used for the dispensing of other materials, particularly dry particulate material wherein the particulate material to be dispensed is prone to gravity flow. The subject dispenser assembly comprises a container having a hollow interior of sufficient dimension to hold sufficient quantity of dry material being dispensed. A mounting means, preferably in the form of shoulder straps or like body harness, is connected to exterior portions of the container and, as set forth, is adapted to mount the container on the back of a laborer or user. It is, of course, to be noted that the dimension and configuration of the container and the structure of the mounting harness is such as to provide maximum comfort to the carrier, taking into consideration load restrictions and weight and content of the material to be dispensed.

A dispensing means is attached to the container and is generally in the form of an elongated conduit. The dispensing conduit has an inlet end connected or communicating with an outlet located at the bottom of the container. The opposite end of the conduit is defined by a free end which is opened so as to allow the dry material to pass therefrom. In a preferred embodiment, to be described in greater detail hereinafter, the conduit means is formed at least in part from a flexible material or is connected to the container by some type of flexible or movable joint so that positioning of the conduit relative to the container can easily occur by the carrier. This allows the "pointing" or aiming of the exit, free end of the conduit directly onto an area of disbursement. The area of disbursement may, in fact, be the roots or trunk of the individual plant or plants being fertilized. Further, the entire dispenser assembly is designed to operate by gravity flow of the dry, particulate material from the interior of the container, along the length of the conduit and out of the exit end thereof.

The dispensing means further comprises what may be considered a holding chamber mounted between the inlet and exit ends of the conduit means and defining a portion of its length. The holding chamber has a hollow interior and may be generally cylindrical in form. The opposite ends of the holding chamber are opened so as to allow passage therethrough of the dry, particulate material upon physical manipulation of a control mechanism associated with the holding chamber.

The holding chamber itself may vary in dimension and configuration such that successive, predetermined quantities of the dry material or fertilizer are individually dispensed onto different ones of a plurality of plants, as will be explained in greater detail hereinafter. It should further be noted that the holding chamber is removably attached to the conduit means, thereby enabling any one of a plurality of different chambers to be mounted on the holding means in an operative fashion. The user of the subject dispenser assembly may want to vary the quantity of the individual amounts of the fertilizer to be dispensed depending upon the particular crop or plant needed to be fertilized. Therefore, the holding chambers may, in fact, be replaced by other holding chambers of different sizes which are designed to hold different quantities.

Portions of the conduit can be made of transparent material or be provided with a sight glass for monitoring the flow of particulate material.

The aforementioned control mechanism includes a valve means operable by and defining as part thereof a control lever. The valve means preferably includes a first and second valve plate attached in spaced apart relation along the length of a control lever. Disposition of the valve plates and selective movement of the valve lever into and out of a dispensing position serves to independently position one of the valve plates into a flow-blocking position relative to the dry material passing through the interior of the holding chamber. The control lever is normally biased into what may be defined as a "closed position".

The closed position in turn may be defined by a first or downstream valve plate disposed within the interior of the holding chamber into a flow-blocking position. Depression or other preselected manipulation of the valve lever into a dispensing position will serve to concurrently remove the first or downstream valve plate from the interior of the holding chamber and position the second or upstream valve plate into a flow-blocking position. This will open what may be referred to as an outlet end of the holding chamber and allowing the interior of the holding chamber to communicate with the exit end of the conduit. The orientation of the entire conduit, including the holding chamber, into a downwardly oriented position will allow gravity flow of the dry material from the interior of the container through the free exit end of the conduit and outwardly therefrom onto the area of disbursement which may be directly onto the plant to be fertilized.

Subsequent positioning of the control lever to a closed position will again reposition the first or downstream valve plate into a flow-blocking position, and concurrently remove the upstream or second valve plate from the interior of the holding chamber. This will then allow free communication and material flow from the container through the upper portion of the conduit into the interior of the holding chamber so as to fill the holding chamber with a predetermined amount of dry material, depending upon the overall size of the interior of the holding chamber. This amount can then be dispensed by again depressing or otherwise positioning the control lever into the aforementioned and defined dispensing position.

Additionally, the present invention provides a new and useful dispensing valve for dispensing any type material. In particular, a double valve dispenser is disclosed in the Figures and description which utilizes a trigger action or an easily gripped handle configuration which provides for a quick and effective dispensing. Thus, the valve means described can be utilized not only in the agricultural fields, but for dispensing other commodities such as laundry detergent in the home or bulk materials in a store, such as candy, flour, sugar, coffee or any other use where a successive controlled dispensing is required.

BRIEF DESCRIPTION OF THE DRAWINGS

FIG. 1 is a perspective view of the exterior of the dispenser assembly of the present invention;

FIG. 2 is a sectional view and partial cutaway showing interior portions of a holding chamber and a valve mechanism associated therewith;

FIG. 3 is a transverse sectional view along line 3—3 of FIG. 2;

FIG. 4 is a cutaway view and partial detail and section of a portion of the container;

FIG. 5 is a perspective view and partial cutaway and section showing operation of the subject dispenser assembly. Like reference numerals refer to like parts through the several views of the drawings;

FIG. 10 is a perspective view of another embodiment of the present invention;

FIG. 11, is a sectional view of a valve means of FIG. 10;

FIG. 12 is a sectional view taken generally along XII—XII of FIG. 11;

FIG. 13 is a sectional view taken generally along XII—XII of FIG. 11 with the valve in an open condition;

FIG. 14 is an elevational view of alternate embodiment of a valve means;

FIG. 15 is an elevational view of a further embodiment of a valve means;

FIG. 16 is a sectional view taken generally along line XVI—XVI of FIG. 11;

DETAILED DESCRIPTION OF THE PREFERRED EMBODIMENT

Figure 6:
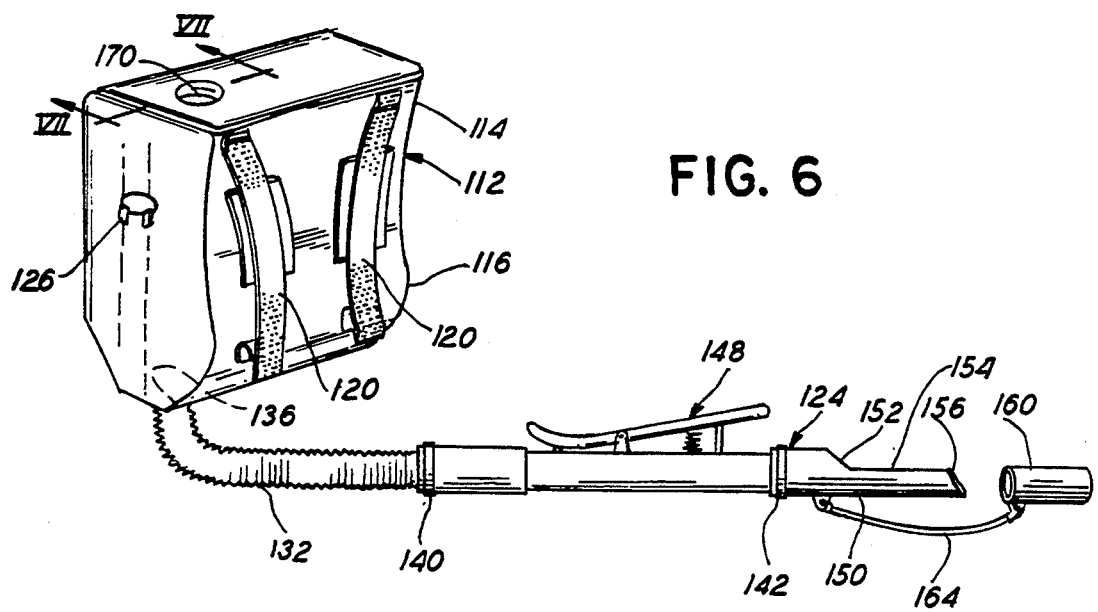
FIG. 6 is a perspective view of an alternate embodiment of the invention.

As shown in the accompanying figures, the dispenser of the present invention is generally represented in FIG. 1 as 10 and includes a hollow interior container 12. The container 12 has an access opening or like area as at 14 through which dry, particulate material, such as fertilizer, may enter the interior of container 12. The lower end of the container as at 12' as shown in FIG. 4 includes an outlet 16 through which the dry material 18 may pass, due to gravity, when in an operative position such as shown in FIG. 1 and/or 5. The interior of the container 12 may have a slanted bottom or other structural component as at 19 to aid in the guiding of the material 18 to the outlet 16 in the lower portion 12' of container 12.

A mounting means may be attached to the exterior of the container 12 and may take the form of a body harness and/or shoulder straps 20 structurally adapted to mount the container 12 on the back of a carrier which may be a human laborer.

Other features of the present invention are shown in FIG. 5 wherein a support platform as at 23 may be secured in somewhat supporting engagement to the lower end 12' of the container 12. The strap ends as at 20' may be attached to the support platform 23 to aid in the support and mounting of the container 12 on the carrier's back.

An important feature of the present invention is represented primarily in FIGS. 1, 2, 3 and 5 and includes a conduit means generally indicated as 24. The conduit means comprises a first segment as at 26 and a second segment 28. The first and second segments 26 and 28 are separated by a holding chamber 30 which also has an elongated hollow interior 32 and two oppositely disposed open ends 35 and 36. These opened ends are preferably removably attached to correspondingly positioned ends 26' and 28' of the conduit segments 26 and 28 so that the interior 32 of the holding chamber 30 effectively defines a length and a path of flow for the dry material 18 to pass. More specifically, the conduit means 24 includes an inlet end portion 38 and an exit end as at 39. The inlet end portion 38 is connected one open end of the first conduit segment 26 and is attached thereto by a coupling or like structure 34. The opposite end of inlet end portion 38 is connected to the outlet 16 communicating with the interior 18 of the container 12. The oppositely disposed exit end 36 is defined by a free end of the second conduit segment 28 and is opened to allow the material to pass therefrom upon its exiting of the conduit means 24. The inlet end portion 38 can be rotationally freely connected at the outlet 16 to provide for swinging the conduit means 24 during dispensing.

The segments 26 and/or the holding chamber 30 can be fashioned of transparent plastic or have an eyeglass winder therethrough to give visual indication to our operator as to the type of material flowing therethrough or to indicate blockage or indicate an empty condition in the container 12. The segment 28 can likewise be transparent.

An important feature of the present invention is the provision of a valve means and a control mechanism associated with the holding chamber 30. More specifically, the valve means comprises a first or downstream valve plate or member 40 attached to and movable with a control lever 42. A second or upstream valve plate 44 is spaced from the first valve plate 40 and attached to and also movable with the control lever 42. The control lever 42 is pivotally attached to the holding chamber by means of a mounting bracket 47 which is secured to the holding chamber by a connecting and/or pivot pin 48 (see FIG. 3). By virtue of this connection, the control lever 42 may be reciprocally positionable in accordance with the directional arrows 43 and 45. Further, the control mechanism, as set forth above, includes a biasing spring 46 connected to the control lever so as to exert a biasing force thereon which normally biases the control lever 42 into what may be referred to as a closed position, represented in solid lines in FIG. 2. The closed position may also be defined as a non-dispensing position of the control mechanism and occurs when the valve lever 42 is not depressed or positioned against the biasing force exerted thereon normally by the biasing spring 46. The closed or non-dispensing position is further defined by the first or downstream valve plate 40 disposed within the interior 32 of the holding chamber 30 and into what may be referred to as a flow-blocking position relative to dry material passing through the holding chamber 30. Concurrently, the second or upstream valve plate is located almost totally out of the interior 32 of the holding chamber 30 so as to allow flow of dry material from the first conduit segment 26 through the opened end 34 and into the interior 32 of the holding chamber 30. The holding chamber will thereby be filled or at least partially filled with the material passing from the interior 18 of the container 12. When it is desired to dispense a given amount of material or the amount now held within the interior 32 of the holding chamber 30, the control lever 42 is depressed and positioned downwardly in accordance with the directional arrow 45 of FIG. 2. This moves the control lever 42 against the biasing force exerted thereon by biasing spring 46 and concurrently positions the upstream or second valve plate 44 into a position represented by the broken lines as at 44' at the same time the first or downstream valve plate 40 is removed from the interior of the holding chamber 30. This establishes communication between the interior 32 and the second conduit segment 28 as well as the exit end 36 of the conduit segment 28. When the conduit means 24 is properly angled downwardly and effectively aimed or directed at a plant, generally indicated as 50 or other disbursement area, the material as at 18' previously within the holding chamber 30 will flow therefrom, through the second conduit segment 28 and out the exit end 36 onto the plant or disbursement area as pictured.

It should be readily apparent that the dimension and/or overall configuration of the interior 32 of the holding chamber 30 is determinative of the individual quantities or amounts of fertilizer which are successively disbursed. Since the amount of fertilizer or dry material each plant 50 may receive may vary depending upon the type of fertilizer and/or type of plant, a user of the subject assembly can vary the individual amounts successively disbursed merely by changing the holding chamber 30 to one of a different size. Such is accomplished by removable attachments as at 48a and 49 serving to removably connect the holding chamber 30 to both the first and second conduit segments 26 and 28, respectively. Alternatively, a screwed connection or a resilient interfitting connection could be utilized to connect the conduit segments 26, 28 and the holding chamber 30.

FIG. 6 shows an alternate embodiment featuring a curved container 112 having a side 114 formed with a curvature to comfortably form or contour against a user's back when carried. A lower portion 116 would interfit into the small of a person's back, between the upper back and shoulders and the buttocks. Upper contours can be provided to fit comfortably across the upper back. Similar to the previous embodiment, two backstraps 120 are provided for carrying on a user's back. A C-shaped resilient clamp 126 is provided on a side of the container 112 for hanging up the hose 124 when not in use. The container 112 and the hose 124 can thereby be carried while freeing up the user's hands during transport.

The hose 124 comprises a flexible segment 132 connected to an outlet 136 at a bottom of the container 112. Screwed connections 140, 142 are provided on other side of a valve means 148, the valve means 148 similar in operation to that described with respect to the conduit means 30 as shown in FIG. 1. An outlet conduit 150 is provided, screwed onto the screw connection 142. This outlet conduit 150 differs from the conduit 28 of FIG. 1 in that it is reduced in diameter at a reducing section 152 to a smaller diameter tube portion 154 which has an angularly cut open end 156 forming an inclined elliptical opening. A cap 160 can be interfit over the opening 156 when not in use, the cap 160 being tethered by a string 164 to the hose 124. The reduced diameter tube 154 gives greater control over the application of the particulate material, and the beveled opening 156 allows increase visual control to the swinging distribution of the particulate material to be dispensed. The user in effect swings back and forth the hose 124 to sprinkle out the particulate material from the beveled opening 156.

Figure 7:
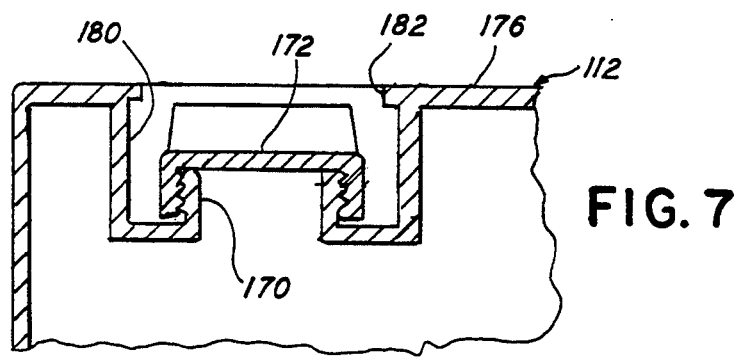
FIG. 7 is a sectional view taken generally along line VII—VII of FIG. 6.

FIG. 7 shows a circular inlet opening 170 of the container 112. The opening 170 is closed by a screwed cap 172. A top 176 of the container 112 has a recessed tube 180 having overhanging peripheral lip 182, and which terminates at the inlet opening 170. Thus, the container can be stacked flushly either upside down on a floor or can have another container stacked on top thereof because the top surface 176 provides a substantially flush surface with no inlet nozzle or cap protruding therefrom. The circular peripheral lip 182 also provides a gripping handle for a user to lift the container 112.

Figure 8:
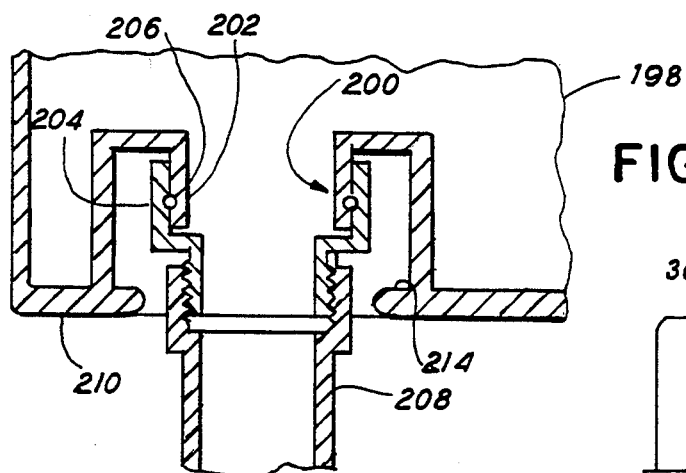
FIG. 8 is a sectional view of an alternate outlet of the container shown in FIG. 1.

FIG. 8 shows a bottom portion of an alternate container 198 in sectional view having a recessed rotational outlet 200 having a circular opening 202 attached to a nozzle portion 204 by a rotational seal 206. The nozzle 204 has at its distal end a threading, either male or female, to connect to a hose 208 which extends into a hose means, such as that shown as 124 at FIG. 6 (not shown). Similar to the arrangement in FIG. 7, the opening 200 is recessed from a bottom surface 210 of this container 198. A peripheral lip 214 is provided for a user to grab to lift the container (when upside down).

Figure 9:
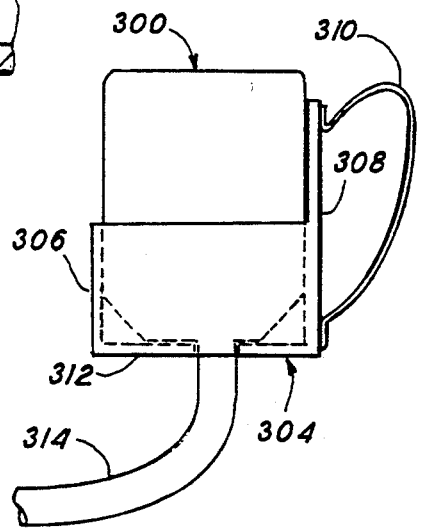
FIG. 9 is a perspective view of a further alternate embodiment of the present invention.

FIG. 9 shows in another embodiment of the invention a container 300 having the features of either the container of FIG. 1 or FIG. 6, but is carried by a user via a holster means 304. The holster means 304 provides a supporting framework 306 which captures at least a lower half of the container 300 therein. A back wall 308 mounts thereto at least one shoulder strap 310. The shoulder strap 310 could either be slung over a user's shoulder, or could be backstraps such as shown in FIG. 1. This embodiment is particularly suited for smaller containers 300. The framework 306 provides an opening 312 for exit of a dispensing tube 314 as described either in FIG. 1 or FIG. 6.

The present invention provides selective functionality in that the containers 12, 112, 300 can be sized in an array of sizes particular to the type of material being dispensed. Additionally, the containers can be color coded, as can the conduit means 24, 124, for dispensing particulate materials which should be segregated, such as one color for pesticides, another color for fertilizers, and another color for organic fertilizers, etc.

Additionally, the valve means or holding chamber 30, 148 can be particularly sized, either in diameter or length, to correspond to the particulate matter being dispensed. Thus smaller or larger volume of each application can be achieved, depending on the material to be dispensed. The valve means or holding chamber 30, 148 can be sold with the particulate matter and snapped into place in the conduit means 24, 124 such as by a resilient connection or by a screwed connection.

As an additional feature, the inside wall 19 of FIG. 4 can be fashioned as the outside wall, that is, the container can have sloping outside walls at its bottom rather than an inside funnel.

FIG. 10 shows an alternate embodiment to the apparatus of FIG. 1. In this embodiment an advantageously shaped container 324 and an alternate valve means 330 are used. Additionally, a switchover valve 336 is utilized. The container uses a notch 340 formed in a side 342 of the container 324 for locating the fill nozzle 344 recessed from the side 342. The fill nozzle 344 has a cap 346 connected to the side 342 by a tether 348. Padded shoulder straps 350, 352 are used for holding a container 324 on the back of a worker. The shoulder straps 350, 352 are engaged to the container 324 with recessed loops 354, 356, 358, 360 respectively. A top surface 362 of the container 324 is thereby flat, having no nozzle protruding therefrom. Also, the surface of the side 342 split by the notch 340, is also flat. These flat sides provide for compact storage of a plurality of the containers 324 for example in a truck. The container also provides a sloping floor 370 from the side 342 down to an outlet nozzle 372 which is connected to an outlet hose 374.

The outlet hose 374 is connected to the switchover valve 336 such as by a screwed fitting 376. The switchover valve 336 provides a gate 378 which can be manually slid downward into the body 380 of the valve to close the valve in a guillotine fashion, and can be lifted upward to thereafter open the valve. The gate 378 fits tightly within a slot 382 in the body 380. Connected to the valve 336 by a screwed coupling 384 is the alternate valve means 330. Connected to an outlet 386 of the alternate valve means 330 by screwed coupling 388 is an outlet distribution tube 390. It follows from FIG. 10 that the alternate valve means 330 can be removed without spillage after the closing of the switchover valve 336 and a different size valve means 330 can be installed. A different size distribution tube 390 can be installed simultaneously therewith or a different size distribution tube 390 can be installed into the same valve means for changing the rate of flow of solid material being scattered from the apparatus.

FIG. 11 shows the valve means 330 with the apparatus of FIG. 10, or which could replace the valve means 148, 30 of the previous described embodiments or the hereinafter described embodiments. The valve means 330 comprises the outlet end 386 for connecting to the distribution tube 390, and an inlet end 404 for connecting to an upstream conduit or directly to a container holding the material to be dispensed (not shown). The valve means 330 also provides a tubular body 406 with an axial channel 407 and expanded upwardly and downwardly at an inlet valve region 408 and an outlet valve region 410. Bridging between the inlet valve region 408 and the outlet valve region 410 is a bar 412. Surrounding the bar is a handle gripping portion 414. Within the inlet valve region 408 is arranged a spindle 418 and a spring stud 420. The spindle 418 holds thereon a disk 424. The disk 424 is sized and shaped to be able to block the channel 407. The spindle 418 and the disk 424 proceed through a slot 426 in the tubular body member 406. The spring stud 420 provides a mechanical means for which to mount a spring 430 between tubular body 406 and the bar 412. The disk 424 can occupy two positions depending on the position of the bar 412.

The bar 412 can be translated in the direction A through slots 431a, 431b in each of the valve regions 408, 410. A lower position as shown in FIG. 10 would retract the disk 424 from the channel 407 and allow material to pass from the inlet end 404 into a central volume 432 of the channel 407. When the disk and the spindle 418 are translated upward according to FIG. 10 the disk 424 is placed in the position to block entrance between the inlet 404 and the central volume 432. The disk 424 is shaped to cover the cross sectional open area of the channel 407.

The body 406 and handle 414 have finger contoured outside surfaces 406a, 414a, for ease of handling in use.

At the outlet valve region 410, a second disk 436 is mounted to a second spindle 438. The second disk 436 is shown blocking flow from the central volume 432 to the outlet 386. When the bar 412 is pressed toward the body 406, the disk 436 and the second spindle 438 are translated upwardly, according to FIG. 10, within a slot 440 formed in the tubular body 406. Below the disk 436 on the spindle 438 is an aperture or an open region 441. The central volume 432 is thus opened to the outlet 386 and the material can be dispensed.

The second spindle 438 also serves as a spring stud in that a second spring 450 can be mounted therearound to bias the bar 412 away from the body 406.

The alternate valve means 330 can be mounted directly to a container having a supply of dry material therein. The assembly can be arranged in a vertical configuration for gravity flow. Such a dispensing arrangement could be used for dispensing laundry detergent or any other bulk material where measured successive amounts need to be dispensed. The valve means could incorporate a coin fed interlock to sell the successively dispensed amounts.

FIG. 12 shows the outlet valve region 410. In FIG. 12 the disk 436 in a closed position, blocking the channel 407. The second spring 450 is shown, a per FIG. 11 to be in a somewhat relaxed state.

FIG. 13 shows the handle 412 being displaced upwardly and compressing the spring 450. The spindle 438 has extended the disk 436 up past the channel 407. Thus, substantially all of the channel 407 is now open, except for the profile of the spindle 438.

FIG. 14 shows a further embodiment of a valve means 500. This valve means has an easy to use gun shape. The valve means is similar to the valve means 330 of FIG. 11 except that a bar 504 is translated in the direction A via a compression cable arrangement. A pivotable handle 508 is mounted for rotation about a pin 510 on the valve means 500. At a bottom end of the handle 508 is mounted a spring 512 to bias the handle 508 in an outward direction. Mounted coaxially within the spring is a compression cable 514 which enters a handle 518 of the valve means 500. Within the handle 518 is mounted a cable sleeve 520 which extends upward to a position below the bar 504. The cable 514 protrudes outwardly of the sleeve 520 and is connected via a joint 524 to the bar 504. Thus, by pivoting the handle 508 inwardly toward the handle 518, the compression cable 514 proceeds through the cable sleeve 520 and exerts an upward force on the bar 504 to translate the bar in a direction A. The inlet valve region 408 and outlet valve region 410 including the spindles, springs, spring studs, and discs located therein can function identically to the embodiment of FIG. 11.

FIG. 15 shows an additional gun shaped embodiment of the valve means 600 wherein the inlet valve regions 408 and the outlet valve region 410 as well as the spindles, discs, springs and spring studs can function identically to that of FIG. 11. However rather than slots extending upward above the channel 407, the body is in the form of a pipe portion 601 and an overlying casing 602. Slots 603a, b are cut through the pipe portion 601 of the protrusion upward of the disks. Additionally, weakened slot outlines 603c, d or more can be provided during manufacture to convert the valve means 600 at a future date to have a smaller dispensing volume between the disks. The outlines would then be punched out to fit in new disks and if necessary, a new bar. A lever or trigger 604 is provided mounted for pivoting motion about a pin 606 toward a handle 608 of the valve means 600. A base end of the lever 604 comprises an offset cam portion 610 which is pressable against a bar 612 to translate the bar 612 in the direction A to activate the valve means. This occurs when the lever 604 is gripped and squeezed against the handle 608.

As shown in FIG. 15, the distribution tube 390 is screwed onto the outlet end 386 and can be sized in diameter to increase or decrease the dispensing speed and dispersion of the solid material. The distribution tube 390 can comprise a ¾" tube wherein the outlet end 386 is a one inch tube. The distribution tube 390 can alternately be a full size one inch tube.

FIG. 16 shows the inlet valve region 408 in more detail. The disk 424 comprises an upper region 650 having an aperture 654 which registers with the channel 407 to permit flow therethrough. A lower solid portion 656 of the disk 424 is solid and has a surface area sized to cover the channel 407. In the dashed configuration the disk 424 has been raised and the aperture 654 has come out of registry with the channel 407 and the solid portion 656 now covers the channel 407. The outlet valve region can be configured similarly except with the upper region 650 and the lower portion 656 reversed so that upward movement of the spindle places the aperture 654 in registry with the channel 407.

The handle 608 and the trigger 604 can have finer gripping contoured surfaces 608a, 604a respectively, as can any of the valve means embodiments described herein.

Figure 17:
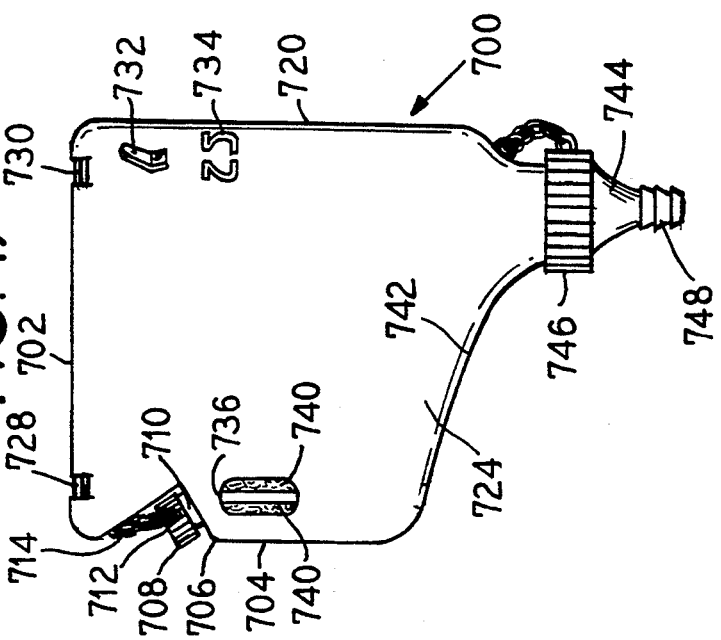
FIG. 17 is a back side elevational view of another container.

FIG. 17 shows an alternate embodiment of a container 700 of the present invention. The container 700 is shaped effectively for maximum container packing density in field trucks wherein a large quantity of the containers can be transported to remote locations in the fields where the large work force can be assigned individual containers for dispensing fertilizer. The container 700 provides a top side 702 which is substantially flat for stacking. The container 700 also provides a flat side wall 704 with a recess 706 wherein an inlet port 708 is located. The inlet port has a threaded neck 710 which holds a threaded cap 712 thereon. The threaded cap 712 is anchored by a tether 714 to a wall of the recess 706. An opposite side wall 720 is also substantially flat. A front wall 722 and a back wall 724 are also flat. Strap anchors can be arranged on a front wall of the container 700 for back mounting the container as described below.

On a backside of the container 700 is arranged recessed hook bars 728, 730 for attaching carrying straps. The hook bars can be formed similar to a hook bar 760 as described below. A hook 732 and a C-shaped clamp 734 are attached on a backside to provide means for holding the distribution hose when not in use. The C-clamp 734 clamps around circumference of the hose and the hook 732 engages a portion provided on the hose to prevent the hose from falling downward out of engagement with the C-clamp 734. The C-clamp 734 is shown laying downward flatly as it can be hinged for packing during truck transport, i.e., to reduce protrusions from the container wall. When laying flatly it can fit into a recess to ensure a flat back wall 724. The hook 732 can also be recessed or can be replaced by a hook-bar similar to hook bar 730. A handle 736 is formed by providing a recess 740 on opposite sides and below the handle 736. Thus, the handles 736 does not protrude outward of the container 700. Alternatively the handle 736 could merely extend outward from the front side 724 without any recess. The container 700 provides a sloping bottom wall 742 extending downward to an outlet nozzle 744 which provides a screwed connection 746 to the container 700 on one end and a multi-ribbed hose coupling 748 on an opposite end thereto.

Figure 18:
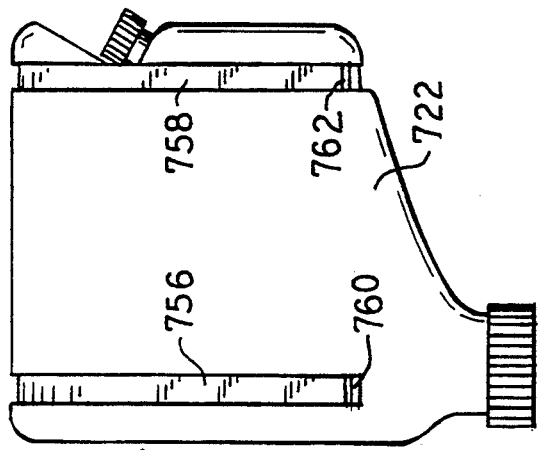
FIG. 18 is a front side elevational view of the container of FIG. 17.

FIG. 18 shows the front side 722 of the container 700 having recess channels 756, 758 for holding shoulder straps therein when not mounted on a workers back. These recesses provide for close packing of a plurality of the containers in a truck. With the shoulder straps pressed into the recesses 756, 758 the front side 722 defines the furthest extension at a front of the container. At a low end of each recess is arranged a hook-bar 760, 762 for attaching the shoulder straps thereto. The recesses 756, 758 extend across the top wall 702 to the hook bars 728, 730.

Figure 19:
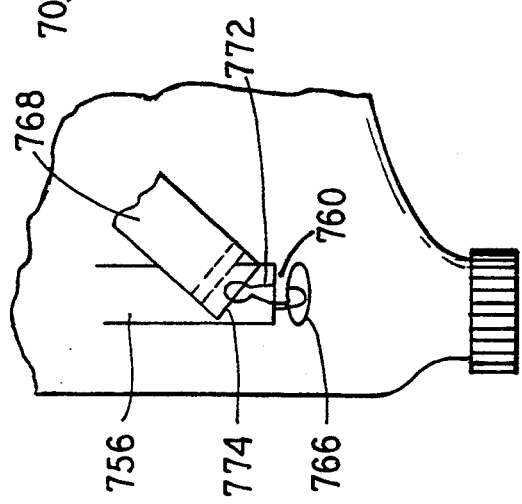
FIG. 19 is a partial enlarged elevation view of the container of FIG. 18 with a shoulder strap installed.

As shown in FIG. 19, the hook bar 760 is formed by an additional recess 766 below the hook-bar 760 which additionally undermines the hook-bar 760 and is connected to the recess 756; thus the hook-bar 760 bridges across the two recesses. A shoulder strap 768 is shown clipped to the hook-bar 760. An openable clip 772 is used, itself hooked to a bar 774 of the strap 768. The hook-bar 762 can be identically formed.

Figure 20:
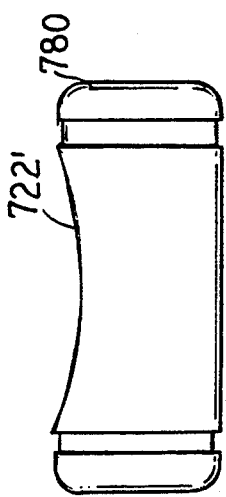
FIG. 20 is a top plan view of the container of FIG. 17.

FIG. 20 shows an alternate embodiment of the container 780 wherein a front side 722' can be slightly concave to more ergonomically fit a worker.

Figure 21:
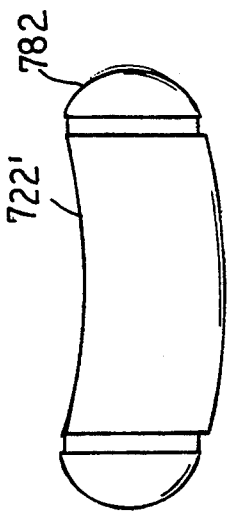
FIG. 21 is a top plan view of an alternate container.

FIG. 21 shows an additional embodiment of the container 782 having a more rounded profile with a similar front side 722'.

Although the present invention has been described with reference to a specific embodiment, those of skill in the art will recognize that changes may be made thereto without departing from the scope and spirit of the invention as set forth in the appended claims.

I claim as my invention:

1. A dispenser assembly for dispensing predetermined amounts of dry material, said assembly comprising:
    a container having a hollow interior and structurally adapted to hold the dry material to be dispensed therein and including an outlet formed in a lower end of the container;
    mounting means connected to said container on an exterior portion thereof and structured for supporting said container in an operative position on a carrier;
    an elongate dispensing hose connected to said outlet;
    a valve means in line with said hose and having a handle extending perpendicularly from said hose and a trigger lever extending adjacent said handle, said handle and said trigger lever sized and adapted to be gripped together by the carrier's hand, squeezing of said trigger lever to said handle activates said valve means for dispensing a predetermined volume of material through said elongate hose;
    wherein said valve means comprises a first and a second valve member attached together by a bar engageable by said trigger lever, said valve members in spaced relation to one another along a predetermined length of said hose, said first and second valve members alternately positionable into and out of said hose in flow blocking relation to material within said hose and thereby defining a respective closed position of each of said first and second valve members; and
    a biasing means connected between said bar and an exterior surface of said hose and adapted to normally bias said first valve member into said closed position adjacent a down stream end of said holding chamber.

2. An assembly as in claim 1 wherein each of said valve members comprises a plate alternately movable between an opened and closed position relative to flow of material through said conduit, each of said plates having a diameter at least minimally greater than an internal diameter of said hose.

3. An assembly as in claim 2 wherein each of said plates are alternately disposable into said holding chamber in substantially perpendicular relation to a longitudinal axis of said holding chamber when in said closed position.

4. An assembly as in claim 3 wherein each of said plates are alternately disposable exteriorly of said conduit and holding chamber when in said opened position.

5. An assembly as in claim 1 wherein said container comprises flat sides, a flat front face, a flat back face, and a first top, all without protrusions for close cubical packing in field trucks.

6. An assembly as in claim 5 wherein said mounting means comprises parallel backstraps laterally arranged on a front side of said container, and said container comprises recessed slots wherein said straps can be held therein to prevent protrusion outward of said front side when said straps are not in use.

7. A dispenser assembly for dispensing predetermined amounts of dry material, said assembly comprising:
    a container having a hollow interior and structurally adapted to hold the dry material to be dispensed therein and including an outlet formed in a lower end of the container;
    mounting means connected to said container on an exterior portion thereof and structured for supporting said container in an operative position on a carrier;
    an elongate dispensing hose connected to said outlet;
    a valve means in line with said hose and having a handle extending perpendicularly from said hose and a trigger lever extending adjacent said handle, said handle and said trigger lever sized and adapted to be gripped together by the carrier's hand, squeezing of said trigger lever to said handle activates said valve means for dispensing a predetermined volume of material through said elongate hose;
    wherein said valve means comprises a bar connected to an inlet disk and an outlet disc, said inlet disk arranged and adapted to be insertable into said hose, said outlet disk arranged and adapted to be protrudable out of said hose, said bar biased away from said hose to hold said inlet disk out of said hose and said outlet disk inside said hose, open for flow and blocking for flow respectively, and said trigger lever comprises a pivotable cam portion abuttable against said bar, squeezing of said trigger lever causing said cam portion to thrust said bar against said bias to insert said inlet disk into said hose and to protrude said outlet disk out of said hose.

8. A dispenser assembly according to claim 1 wherein said container comprises a hard shell having a rectangular profile without protrusions therefrom for close packing in a field truck and said outlet recessed from said rectangular profile;
    and said mounting means comprises shoulder straps connected to said container on an exterior portion thereof.

9. A dispenser assembly designed to dispense predetermined amounts of dry material, said assembly comprising:
    a hard shell container having a hollow interior and structurally adapted to hold the dry material to be dispensed therein and including a outlet formed in a lower end of the container;

shoulder straps connected to said container on an exterior portion thereof and structured for supporting said container in an operative position on a carrier;

an elongated dispensing hose connected to said outlets;

a valve means in line with said hose and having a trigger lever extending from said hose, movement of said trigger lever activating said valve means for dispensing a measured volume of material through said elongated hose;

wherein said valve means comprises a bar connected to an inlet disk and an outlet disc, said inlet disk arranged and adapted to be insertable into said hose, said outlet disk arranged and adapted to be protrudable out of said hose, said bar biased away from said hose to hold said inlet disk out of said hose and said outlet disk inside said hose, open for flow and blocking for flow respectively, and said trigger lever comprises a pivotable cam portion abuttable against said bar, squeezing of said trigger lever causing said cam portion to thrust said bar against said bias to insert said inlet disk into said hose and to protrude said outlet disk out of said hose.

10. A gun shaped dispenser valve for dispensing predetermined amounts of dry material, comprising:

a cylindrical barrel having a predetermined volume and having an open inlet and an open outlet in axial alignment with said barrel;

a handle fixedly extending at an angle from said axis of said barrel;

a trigger pivotably mounted with respect to said handle;

an inlet disk arranged slidable perpendicularly to said barrel and insertable into and out of said barrel;

an outlet disk arranged slidably insertable into and out of said barrel; and means for converting a squeezing motion of said trigger toward said handle into movement of said inlet disk into said barrel and said movement of said outlet disk out of said barrel;

wherein said barrel, said bar and said disks are adapted and arranged for said inlet disk and said outlet disk to translate in the same direction upon squeezing of said trigger toward said handle.

11. A gun shaped dispenser according to claim 10 wherein said means for converting comprises a bar connecting said inlet disk and said outlet disk, said bar biased away from said barrel.

12. A gun shaped dispenser valve for dispensing predetermined amounts of dry material, comprising:

a cylindrical barrel having a predetermined volume and having an open inlet and an open outlet in axial alignment with said barrel;

a handle fixedly extending at an angle from said axis of said barrel;

a trigger pivotably mounted with respect to said handle;

an inlet disk arranged slidable perpendicularly to said barrel and insertable into and out of said barrel;

an outlet disk arranged slidably insertable into and out of said barrel; and means for converting a squeezing motion of said trigger toward said handle into movement of said inlet disk into said barrel and said movement of said outlet disk out of said barrel;

wherein said means comprises a bar connecting said inlet disk and said outlet disk, said bar biased away from said barrel;

wherein said means for converting comprises a compression cable connected to sand trigger at one end and to said bar at a respective other end.

* * * * *